US009889959B2

(12) United States Patent
Valli

(10) Patent No.: US 9,889,959 B2
(45) Date of Patent: Feb. 13, 2018

(54) TIGHT SEAL SYSTEM FOR THE PACKAGING OF PRODUCTS

(71) Applicant: REEPACK S.R.L., Seriate (BG) (IT)

(72) Inventor: Livio Valli, Bergamo (IT)

(73) Assignee: REEPACK S.R.L., Seriate (BG) (IT)

( * ) Notice: Subject to any disclaimer, the term of this patent is extended or adjusted under 35 U.S.C. 154(b) by 0 days.

(21) Appl. No.: 15/128,534

(22) PCT Filed: Mar. 26, 2015

(86) PCT No.: PCT/IB2015/052242
§ 371 (c)(1),
(2) Date: Sep. 23, 2016

(87) PCT Pub. No.: WO2015/150993
PCT Pub. Date: Oct. 8, 2015

(65) Prior Publication Data
US 2017/0107007 A1    Apr. 20, 2017

(30) Foreign Application Priority Data

Apr. 1, 2014 (IT) .............................. BG2014A0010

(51) Int. Cl.
*B32B 37/00* (2006.01)
*B65B 51/30* (2006.01)
(Continued)

(52) U.S. Cl.
CPC .............. *B65B 51/30* (2013.01); *B29C 65/02* (2013.01); *B29C 66/1122* (2013.01);
(Continued)

(58) Field of Classification Search
CPC ......... B65B 51/22; B65B 51/30; B65B 51/16; B29C 65/02; B29C 66/1122;
(Continued)

(56) References Cited

U.S. PATENT DOCUMENTS 5,778,641 A * 7/1998 Simionato ............... B29C 65/18
156/308.4
6,161,366 A * 12/2000 Bausch ............. B29C 66/81821
53/373.7
(Continued)

FOREIGN PATENT DOCUMENTS

EP     1433707 A2    6/2004
EP     1810922 A1    7/2007

*Primary Examiner* — James Sells
(74) *Attorney, Agent, or Firm* — King & Schickli, PLLC

(57) ABSTRACT

Tight seal system for the packaging of products comprising a transverse welding station (14) of packaging sheets comprising: a first pair of discs (100) connected centrally to a first axis (101); said first pair of discs (100) rotating about said first axis (101); at least one first bar (102, 103) is positioned peripherally between said first pair of discs (100); a first welding jaw (111) is associated with said at least one first bar (102, 103); said first bar (102, 103) rotating so that said first jaw (111) is always facing in the same direction; a second pair of discs (130) connected centrally to a second axis (131); said second pair of discs (130) rotating about said second axis (131); at least one second bar (132, 133) is positioned peripherally between said second pair of discs (130); a second welding jaw (136) is associated with said at least one second bar (132, 133); said second bar (132, 133) rotating so that said second jaw (136) is always facing in the same direction; said first jaw (111) and said second jaw (136) are facing each other so that, rotating said first pair of discs (100) and said second pair of discs (130), said first jaw (111) and said second jaw (136) come into contact with each other and can perform welding of said packaging sheets; said first welding jaw (111) is associated with said at least one first bar (102, 103) by means of a plurality of pins (112) passing through said first bar (102, 103); two pins (120) secured inferiorly to said first bar (102, 103) support a third bar (121) parallel to said first bar (102, 103); a plurality of springs (122) are placed between said plurality of pins (112) and the inner surface of said third bar (121).

9 Claims, 3 Drawing Sheets

(51) Int. Cl.
    *B29C 65/00*     (2006.01)
    *B29C 65/02*     (2006.01)
    *B65B 51/16*     (2006.01)
    *B65B 51/22*     (2006.01)
    *B29L 31/00*     (2006.01)

(52) U.S. Cl.
    CPC ...... *B29C 66/4312* (2013.01); *B29C 66/8161* (2013.01); *B29C 66/8222* (2013.01); *B29C 66/83543* (2013.01); *B29C 66/849* (2013.01); *B65B 51/16* (2013.01); *B65B 51/22* (2013.01); *B29L 2031/712* (2013.01)

(58) Field of Classification Search
    CPC ............ B29C 66/4312; B29C 66/8161; B29C 66/8222; B29C 66/83543; B29C 66/849
    USPC ...................................... 156/580, 581, 583.1
    See application file for complete search history.

(56) References Cited

U.S. PATENT DOCUMENTS

| | | | |
|---|---|---|---|
| 8,087,220 B2 * | 1/2012 | Uttaro | B26D 1/565 |
| | | | 53/374.6 |
| 9,649,810 B2 * | 5/2017 | Thaerigen | B29C 65/08 |
| 2010/0263336 A1 | 10/2010 | Uttaro et al. | |

* cited by examiner

TIGHT SEAL SYSTEM FOR THE PACKAGING OF PRODUCTS

This application is the national stage of PCT/IB2015/052242, filed Mar. 26, 2015, which claims priority from Italian Application No. BG2014A000010, filed Apr. 1, 2014.

FIELD OF THE INVENTION

The present invention relates to a tight seal system for the packaging of products, in particular for food packaging.

BACKGROUND OF THE INVENTION

There are known automatic flow wrapper machines for packaging and sealing packages.

In the normal operation of automatic flow wrapper machines 6 main stations are used.

The infeed station for manual or automatic loading of the product, equipped with interconnected pushers and driven by a chain or by an endless conveyor belt.

The film station for unwinding the material used to wrap the product wrapping from a reel.

The forming station (or folding box) for conveying the film towards the subsequent station, establishing the form of the final bag inside which the packaged product will be contained.

The longitudinal welding station (consisting of one or more pairs of wheels closed at constant pressure and heated to a predetermined temperature) for the first welding of the film, parallel to the surface on which the product slides along its direction of feed, so as to produce a sort of continuous open tunnel.

The transverse welding station (consisting of one or more pairs of jaws closed cyclically under pressure and heated to a predetermined temperature) for the second welding of the film, orthogonal to the direction of feed of the product, so as to produce a closed bag sealed for the whole of its length and at its ends. A shear blade is inserted inside the welding jaws to enable simultaneous separation of two adjacent products.

The outfeed station for ejecting the product packaged in a bag.

The product, loose or transported in supporting containers arriving from the infeed unit, reaches the folding-box forming unit pushed by carriers on a moving chain or conveyed on a specific belt. A photocell detects the presence of the product according to a predefined position and frequency, suitably adjusting the film unwinding speed around the forming unit and the driving speed of the longitudinal sealing wheels, cyclic and instantaneous closing of the transverse sealing jaws is synchronized with feed of the product, ensuring a final package wrapped around the product according to the real length and width measurements.

Each time it is necessary to operate with products that require extended preservation and consequently modified atmosphere packaging (MAP), the tightness of the weld in time under the effect of the internal pressure exerted by the gas mixture is an important element.

The tightness of the tight seal is a very important specification in order to ensure the tightness of the package inside which the product, generally preserved in modified atmosphere, is contained.

The transverse sealing station is particularly important.

There are two solutions relating to the transverse sealing station, namely the rotary type and the box-motion type, based mainly on the coupling of two jaws with opposite and parallel faces between which the packaging film is blocked and welded.

In the first case, the welding period is almost instantaneous, namely the fraction of second in which the two circumferences, described by the trajectories of the ends of its masses, touch in their point of tangency.

An example of a transverse sealing station of rotary type is described in the document EP 1 810 922.

In the second case, the sealing period is longer, as the coupled jaws trace a linear line in space, parallel to the packaging plane and opposite the direction of feed of the product, so that the combination of the sealing path with the jaws closed and the reverse path to return to the initial position with the jaws open defines a parallelepiped in space, giving rise to the term box-motion.

Alternatively, in the D-CAM type solution two distinct movements are performed, namely a translational movement and a rotational movement.

A suitable combination of pressure, temperature and sealing time enables a correct melting process of the adhesive surface of which the film used for packaging is composed.

The temperature and pressure variables depend on the constructional characteristics of sizing, respectively electrical and mechanical, while a somewhat critical variant in this type of application is the sealing time, as it is strictly linked to the production capacity of these machines: high production rates and consequently a high number of cycles implies a proportional reduction in the duration of the period in which the welding surface is heated and pressed at high temperature.

The main criticalities of transverse sealing solutions are largely related to the effect of the mechanical vibrations that derive therefrom.

This leads to lower performance, due to structural and mechanical limits, to mechanical oversizing to make the structure as a whole more stable, to increased complexity in the construction and control of the transverse welding unit, to a consequent increase in the quantity and costs of the materials used, to less flexibility and capacity to adapt to the sizes of the product without significant operations to reconfigure the machine, and to increased complexity in terms of maintenance and cleaning.

Therefore, as it is only possible to act on the sealing time, the pressure and the temperature being closely linked to the constructional and sizing characteristics of the machine, a suitable transverse welding unit must be used.

In the case of Box-Motion and D-CAM solutions, the two welding jaws are forced to perform a sequence of translational movements that transmit strong vibrations to the machine, which it may not be able to withstand mechanically as productivity increases; to date, machines with QS of the Box-Motion or D-CAM type reach a maximum tested productivity of around 100-120 packages per minute.

Therefore, the possibility of tracing a smoother continuous movement in space, not deriving from a sequence of broken lines, but which nonetheless has a certain rectilinear line in which the two jaws are coupled under pressure and at a temperature for an extended (not instantaneous) time would allow the mechanical vibrations on the machine to be limited and an increase in productivity, at this point highly dependent only on the type of material used.

SUMMARY OF THE INVENTION

In accordance with the present invention, these objects and others yet are achieved by a tight seal system for the packaging of products comprising a transverse welding station of packaging sheets comprising: a first pair of discs connected centrally to a first axis; said first pair of discs rotating about said first axis; at least one first bar is positioned peripherally between said first pair of discs; a first welding jaw is associated with said at least one first bar; said first bar rotating so that said first jaw is always facing in the same direction; a second pair of discs connected centrally to a second axis; said second pair of discs rotating about said second axis; at least one second bar is positioned peripherally between said second pair of discs; a second welding jaw is associated with said at least one second bar; said second bar rotating so that said second jaw is always facing in the same direction; said first jaw and said second jaw are facing each other so that, rotating said first pair of discs and said second pair of discs, said first jaw and said second jaw come into contact with each other and can perform welding of said packaging sheets; said first welding jaw is associated with said at least one first bar by means of a plurality of pins passing through said first bar; two pins secured inferiorly to said first bar support a third bar parallel to said first bar; a plurality of springs are placed between said plurality of pins and the inner surface of said third bar. Further characteristics of the invention are described in the dependent claims.

The advantages of this solution with respect to the solutions of the prior art are various.

The innovative idea that characterises the transverse seal system for flow wrapper machines is based on a new trajectory that allows a continuous epicyclic movement of the jaws in space.

The seal pressure maintained for a certain rectilinear length at a certain temperature, compatible with the type of material used for packaging, for a certain length of time, enables an extended sealing operation to be obtained, guaranteeing the tightness of the weld.

Moreover, due to a calculated compliance between the two jaws in contact, controlled by means of springs, the relative trajectory of the contact-welding point takes a rectilinear trend at constant speed for a certain instant of time. The pressure exerted by the springs and the temperature controlled and imposed on the jaws ensure sealing of the packaging material.

This leads to increased performance due to a drastic and evident reduction in the vibrations generated by the mechanical parts of the transverse sealing unit, substantial resizing of the electromechanical unit, which is more compact and efficient, reduction in the complexity of construction and control of the system, resulting in a decrease in the quantities and costs of materials used, increased flexibility and capacity to adapt to the sizes of the product to be packaged and easier cleaning and maintenance.

With a machine according to the present invention it is possible to reach a productivity of around 150-200 packages per minute, with no (or a considerable decrease in) vibrations.

BRIEF DESCRIPTION OF THE DRAWING FIGURES

The characteristics and advantages of the present invention will be apparent from the following detailed description of a practical embodiment thereof, illustrated by way of non limiting example in the accompanying drawings, wherein.

DETAILED DESCRIPTION OF THE INVENTION

Figure 1:
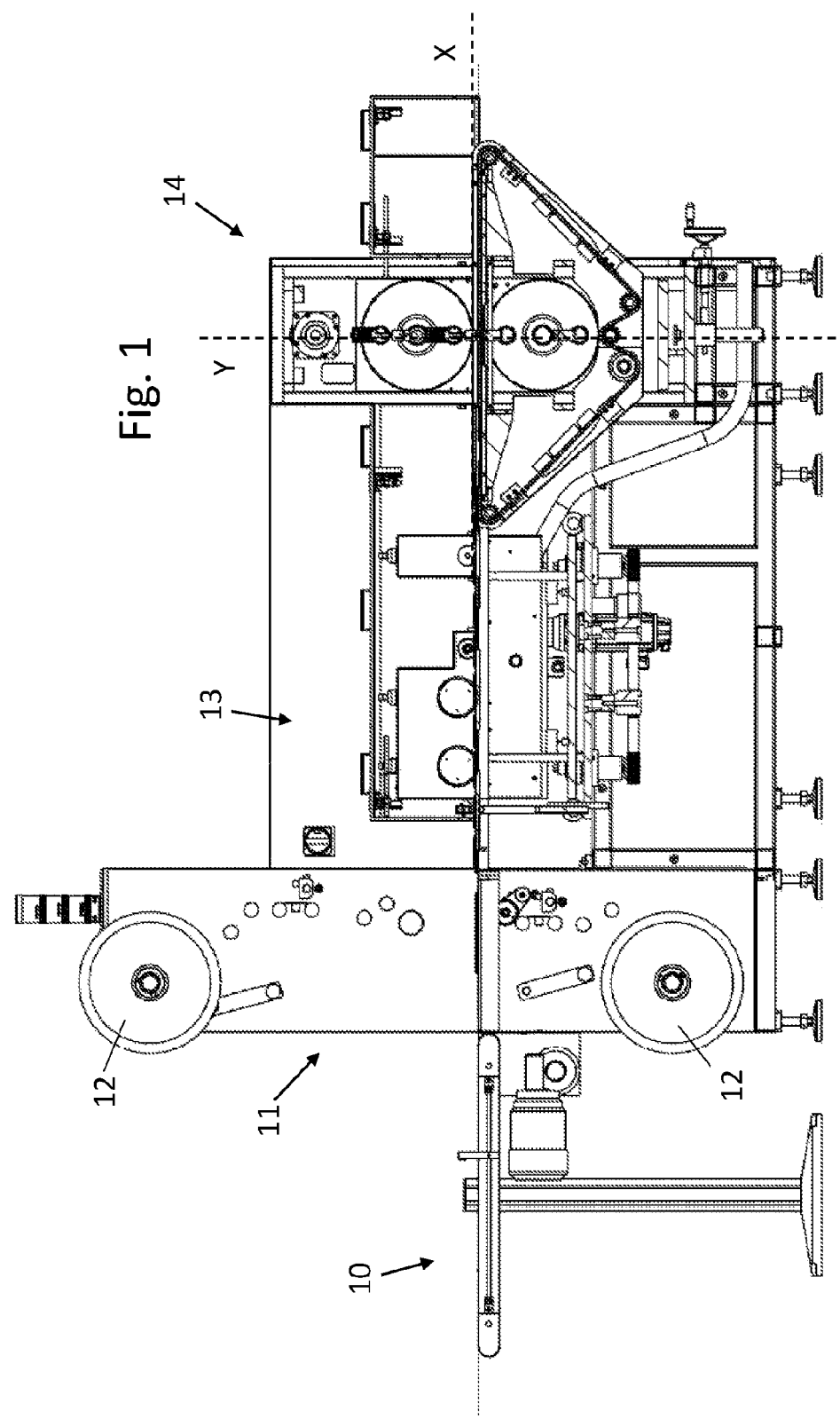
FIG. 1 shows an automatic flow wrapper packaging and sealing machine for products according to the present invention.
Figure 2:
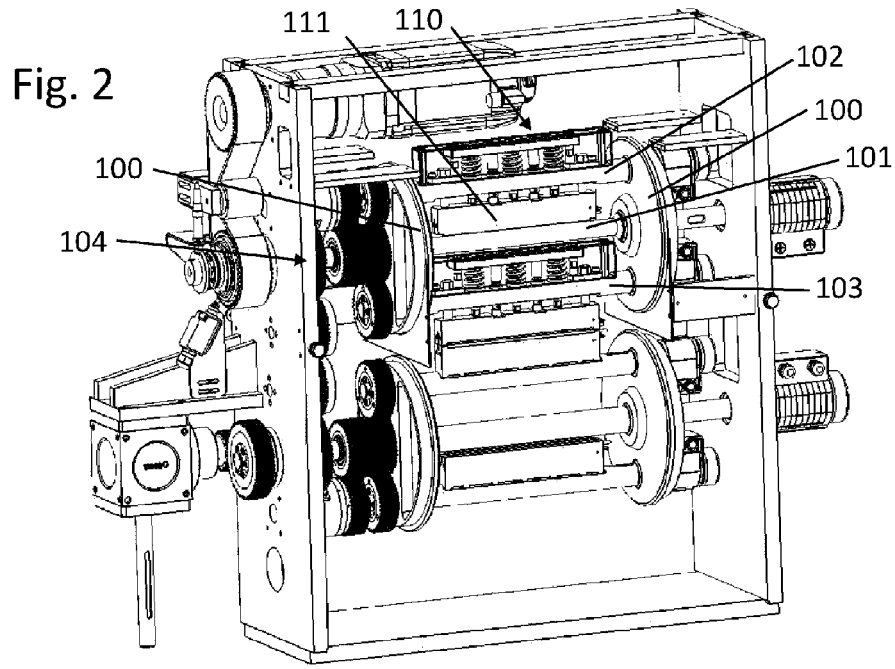
FIG. 2 shows a perspective view from a first side of a transverse welding station of an automatic flow wrapper packaging and sealing machine for products according to the present invention.
Figure 3:
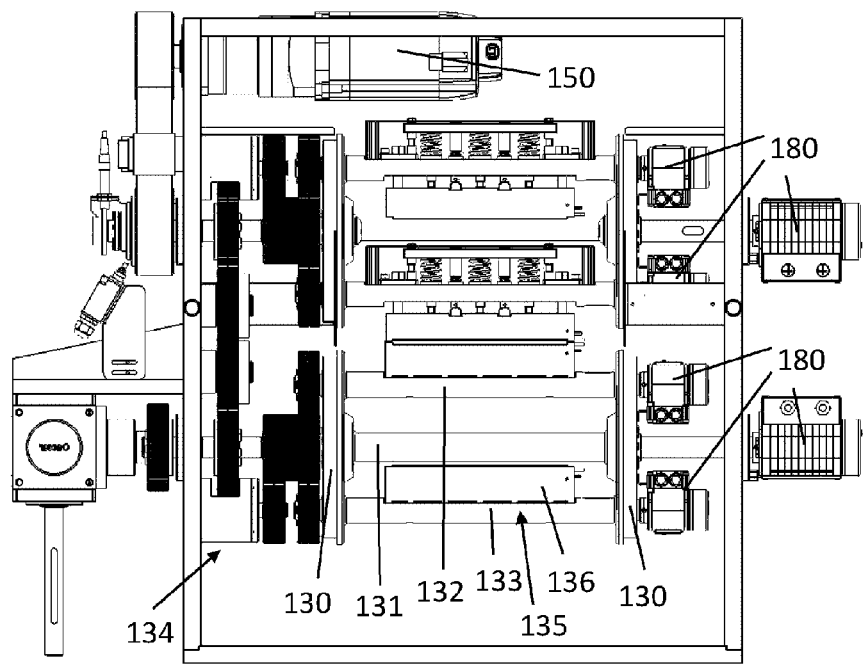
FIG. 3 shows a front view of a transverse welding station of an automatic flow wrapper packaging and sealing machine for products according to the present invention.
Figure 4:
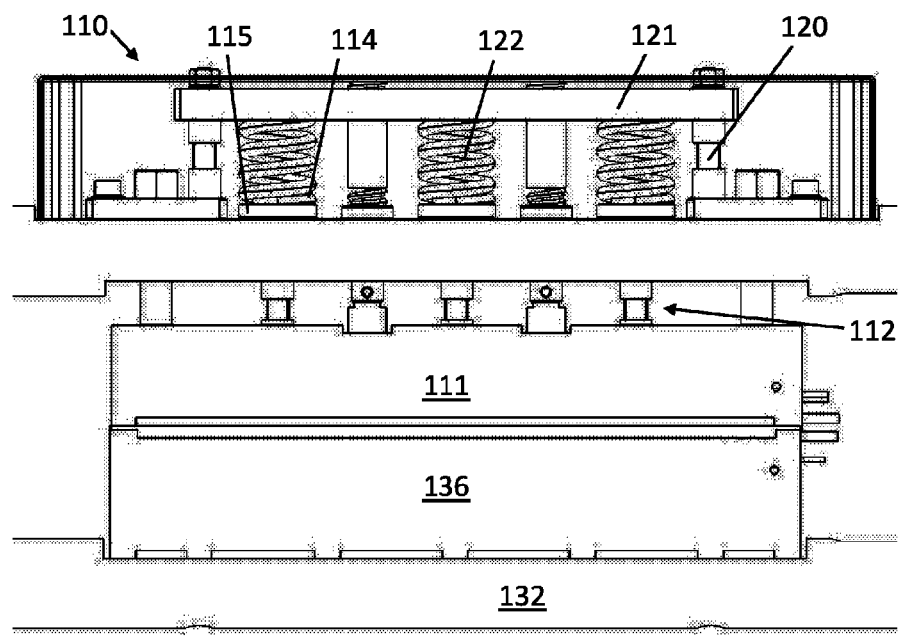
FIG. 4 shows a front view of a welding head of an automatic flow wrapper packaging and sealing machine for products according to the present invention.
Figure 5:
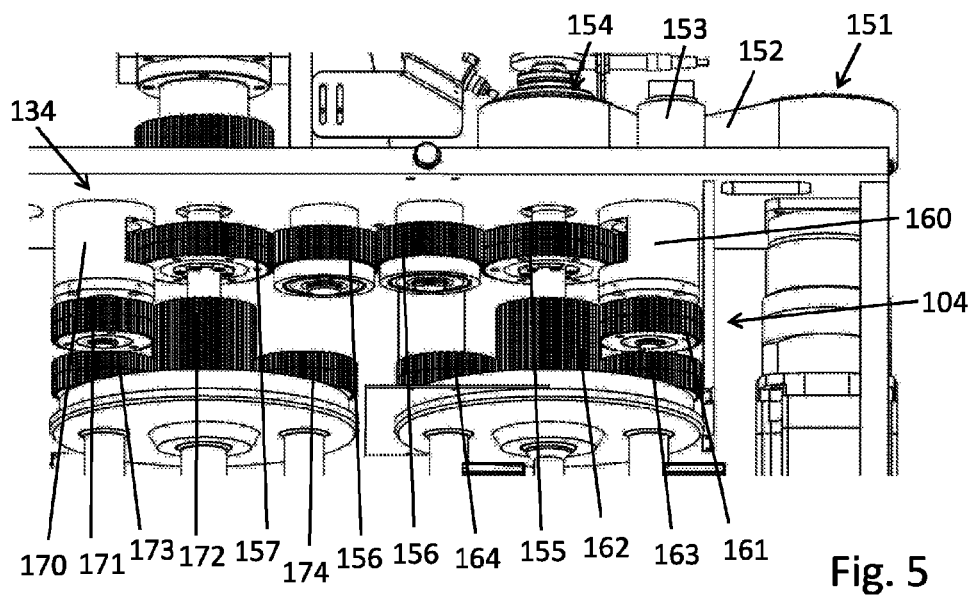
FIG. 5 shows a front view of a the gear system for operation of a welding head of an automatic flow wrapper packaging and sealing machine for products according to the present invention.

With reference to the accompanying figures, an automatic flow wrapper packaging and sealing machine for products according to the present invention comprises a belt 10 for infeed of the product to be packaged, which passes through the film supply and forming station 11, which comprises two reels 12, one upper and one lower, on which the sealing film is wound. The product wrapped by the film then passes to a longitudinal welding station 13 and to a transverse welding station 14. An outfeed conveyor belt 15 conveys the packaged product out of the machine.

The transverse welding station 14 comprises a first pair of supporting discs 100 arranged one in front of the other.

This first pair of discs 100 is pivoted and can rotate about a shaft 101 that joins the two centres of said first pair of discs 100.

Between said first pair of discs 100 there are also peripherally mounted two bars 102 and 103, positioned in proximity of the circumference of the discs 100, and at 180° from each other.

The shaft 101 and the bars 102 and 103 project externally to the discs 100 on one side and each end is connected to a relevant gear, which as a whole form a first epicyclic gear unit 104.

To each bar 102 and 103 there is secured a structure 110 composed of a jaw 111, positioned under the bars 102 and 103 and facing downwards. The jaw 111 comprises a plurality of pins 112 passing through the bars 102 and 103, terminating with a fixing bushing 113, which is positioned externally to the bars 102 and 103, with respect to the jaw 111, and which extends for a predetermined distance beyond the bars 102 and 103. The bushings 113 comprise an upper portion 114 having a reduced diameter with respect to their lower portion 115.

Two pins 120, preferably lateral with respect to the pins 112, secured externally to the two bars 102 and 103, with respect to the jaw 111, support a bar 121 parallel to the bars 102 and 103 and external thereto.

With each of the bushings 113 there is associated a spring 122, which abuts on one side against the upper portion 114 of the bushings 113 and on the other side against the inner surface (facing the bars 102 and 103) of the bars 121.

The transverse welding station comprises a second pair of supporting discs 130 arranged one in front of the other, positioned under the first pair of discs 100.

This second pair of discs 130 is pivoted and can rotate about a shaft 131 that joins the two centres of said second pair of discs 130.

Between said second pair of discs 130 there are also peripherally mounted two bars 132 and 133, positioned in proximity of the circumference of the discs 130, and at 180° from each other.

The shaft 131 and the bars 132 and 133 project externally to the discs 130 on one side and each end is connected to a relevant gear, which as a whole form a second epicyclic gear unit 134.

To each bar 132 and 133 there is secured a structure 135 composed of a jaw 136, positioned above the bars 132 and 133 and facing upwards.

In addition to functioning as a jaw, the jaws 111 and 136 also perform the welding and cutting operation of the packaging film. In fact, they comprise, in a known manner, shear blades and heated welding means.

A motor 150 operates the epicyclic gears 104 and 134. In particular, the motor 150 operates a gear 151 that, by means of a belt 152 and a belt tensioner roller 153, rotates a gear 154 that is secured to the shaft 101. On the shaft 101 there is positioned a gear 155, which by means of two idle gears 156 rotates a gear 157 positioned on the shaft 131.

The gear 155 also transmits motion to a gear 160 secured to a shaft, aligned with the bar 102, which also supports the gear 161. The gear 161 transfers motion to a gear 162 that rotates by means of a bearing about the shaft 101.

The gear 162 transfers motion to the two gears 163 and 164 that respectively rotate the two bars 102 and 103.

Likewise, the gear 157 transmits motion to a gear 170 secured to a shaft, aligned with the bar 133, which also supports the gear 171. The gear 171 transfers motion to a gear 172 that rotates by means of a bearing about the shaft 131.

The gear 172 transfers motion to the two gears 173 and 174 that respectively rotate the two bars 133 and 132.

On the bars 101, 102, 103, 131, 132 and 133, in opposite position to the epicyclic gears 104 and 134, there are located rotating collectors 180 (one for each axis) that supply electricity to the jaws 111 and 136, to weld and cut the film.

In the present description and in the related figures there have been described and represented two upper jaws and two lower jaws. In accordance with the teachings of the present invention, a different number of jaws can be provided, for example from 1 to 4, according to requirements.

Operation of the invention will be apparent to those skilled in the art from the description above and in particular is as follows.

The motor 150 supplies motion to the epicyclic gears 104 and 134 so that the discs 100 and 130 are rotated, transporting with their rotational motion the bars 102 and 103 (upper) and the bars 132 and 133 (lower). The synchronism dictated by the epicyclic gears 104 and 134 is such that the bars 102, 103, 132 and 133 rotate but the jaws 111 are always facing downwards and the jaws 136 are always facing upwards.

Moreover, this synchronism is set so that the upper jaws meet and are aligned with the lower jaws along a vertical axis Y that joins the centres of the bars 101 and 131.

In particular, the jaws 111 and the jaws 136 are positioned on the bars 102, 103, 132 and 133, and spaced from one another, so that the active surfaces (arranged against each other in pairs) meet along a longitudinal plane X placed in the direction in which the products are conveyed well before reaching the vertical axis Y that joins the centres of the bars 101 and 131, and detach from each other well after the vertical axis Y. More precisely, the jaws meet and detach when the radius joining the bar 101 and the bar 102 form an angle β with respect to the vertical axis Y of around −30° and +30°.

That is, the jaws 111 and the jaws 136 remain joined together to be able to perform their welding and cutting function for a considerable time (variable according to the rotation speed of the discs 100 and 130) to allow a suitable operation.

During the instant in which the jaws 111 and the jaws 136 remain joined together, the joining point thereof does not remain in the plane X but is raised and lowered slightly, during welding and cutting, as the lower jaws 136 are fixed while the upper jaws 111, due to the presence of the pins 112 and the springs 122, can perform a vertical movement.

To be able to meet the jaw 111 before the axis Y, the jaw 136 has a length that reaches the axis X with an angle β equivalent to −30°. In this point it meets the film and the jaw 111. By advancing the discs 100 and 130 the jaw 111 yields to the thrust of the jaw 136 (fixed) due to the springs 122, and therefore the joining point of the jaws 136 and 111 is raised slightly, reaches its maximum height in the point in which it meets the axis Y and is then lowered to return to the axis X when the angle β is equivalent to +30°.

During this movement, the jaws 136 and 111 remain vertical and in contact for a length of time sufficient to perform the welding and cutting operations.

Due to the possible vertical movement and to the length of the jaws, the upper jaws 111 and lower jaws 136 can meet before the vertical axis Y and detach after this axis. During the contact time between these, the springs 122 exert a force to maintain the jaws in close contact, so that welding takes place. In this time, the upper jaws 111 have an upward movement thrust by the lower jaws and produced due to sliding of the upper jaws 111 by means of the pins 112.

Regardless of these movements, by controlling the rotation and the driving of the film by means of axes controlled with complex trigonometric algorithms, the masses move with a constant linear speed during the sealing step, ensuring a high quality seal.

In an alternative embodiment a structure can be arranged on the lower bars 102 and 103, such as the structure 110 inclusive of pins and springs, so as to move the joining point of the jaws 111 with the jaws 136 along the plane X.

The materials used to produce the machine and the dimensions can be any, according to requirements and to the state of the art.

All the details of the tight seal system for the packaging of products thus conceived can be replaced by technically equivalent elements.

The invention claimed is:

1. Tight seal system for the packaging of products comprising a transverse welding station (14) of packaging sheets comprising: a first pair of discs (100) connected centrally to a first axis of a first shaft (101); said first pair of discs (100) rotating about said first axis of said first shaft (101); at least one first bar (102, 103) positioned peripherally between said first pair of discs (100); a first welding jaw (111) associated with said at least one first bar (102, 103); said first bar (102, 103) rotating so that said first jaw (111) is always facing in the same direction; a second pair of discs (130) connected centrally to a second shaft (131) having a second axis; said second pair of discs (130) rotating about said second axis of the second shaft (131); at least one second bar (132, 133) positioned peripherally between said second pair of discs (130); a second welding jaw (136) associated with said at least one second bar (132, 133); said second bar (132, 133) rotating so that said second jaw (136) is always facing in the same direction; said first jaw (111) and said second jaw (136) are facing each other so that, rotating said first pair of discs (100) and said second pair of discs (130), said first jaw (111)

and said second jaw (136) come into contact with each other and can perform welding of said packaging sheets; said first welding jaw (111) associated with said at least one first bar (102, 103) by a plurality of pins (112) passing through said first bar (102, 103); two pins (120) secured interiorly to said first bar (102, 103) support a third bar (121) parallel to said first bar (102, 103); a plurality of springs (122) located between said plurality of pins (112) and the inner surface of said third bar (121), wherein said first shaft (101) and said second shaft (131) are rotatably connected at two side shoulders of said transverse welding station (14).

2. System according to claim 1, characterised in that it comprises a first epicyclic gear unit (104) that rotates said first bar (102, 103).

3. System according to claim 1, characterised in that it comprises a second epicyclic gear unit (134) that rotates said second bar (132, 133).

4. System according to claim 2, characterised in that it said first (104) and second (134) epicyclic gear unit respectively comprise a first gear (155, 157) that transmits motion to a second gear (160, 170) secured to a shaft that supports a third gear (161, 171) that transfers motion to a fourth gear (162, 172) that transfers motion to a fifth (163, 173) and a sixth (164, 174) gear that respectively rotate said at least one first bar (102, 103) and said at least one second bar (132, 133).

5. System according to claim 1, characterised in that said first jaw (111) and said second jaw (136) come into contact with each other while the radius created by the line joining said first axis of the first shaft (101) with said at least one first bar (102, 103) forms an angle with respect to a vertical axis (Y) between −30° and +30°.

6. System according to claim 1, characterised in that said first jaw (111) has a vertical movement given by said plurality of pins (112) passing through said first bar (102, 103) opposed by the force exerted by said plurality of springs (122).

7. System according to claim 2, characterised in that said epicyciic gears (104, 134) are synchronized with each other so that said first bar (102, 103) and said second bar (132, 133) rotate, but said first jaw (111) is always facing downwards and said second jaw (136) is always facing upwards.

8. System according to claim 2, characterised in that it comprises a motor (150) that operates said first (104) and said second (134) epicyclic gear.

9. System according to claim 2, characterised in that a motor (150) operates a gear (151), which by means of a belt (152) rotates a gear (154) that is secured to said first shaft (101); on said first axis of the first shaft (101) there is positioned a gear (155), which by means of two idle gears (156) rotates a gear (157) positioned on said second axis of the second shaft (131).

\* \* \* \* \*